(12) United States Patent
Joubert et al.

(10) Patent No.: US 9,932,129 B2
(45) Date of Patent: Apr. 3, 2018

(54) DEVICE FOR MOVING AIRCRAFT ALONG THE GROUND

(71) Applicant: AIRBUS SAS, Blagnac (FR)

(72) Inventors: Emmanuel Joubert, Issy les Moulineaux (FR); Charles Nespoulous, Saint Cloud (FR); Bruno Rechain, Paris (FR); Hichem Smaoui, Paris (FR)

(73) Assignee: AIRBUS SAS, Blagnac (FR)

( * ) Notice: Subject to any disclaimer, the term of this patent is extended or adjusted under 35 U.S.C. 154(b) by 244 days.

(21) Appl. No.: 14/898,128

(22) PCT Filed: Jun. 11, 2014

(86) PCT No.: PCT/EP2014/062072
§ 371 (c)(1),
(2) Date: Dec. 12, 2015

(87) PCT Pub. No.: WO2014/198746
PCT Pub. Date: Dec. 18, 2014

(65) Prior Publication Data
US 2016/0144981 A1    May 26, 2016

(30) Foreign Application Priority Data

Jun. 14, 2013  (FR) ..................................... 13 55597

(51) Int. Cl.
*B64F 1/04* (2006.01)
*B64C 25/32* (2006.01)
*B64F 1/22* (2006.01)

(52) U.S. Cl.
CPC ................ *B64F 1/04* (2013.01); *B64C 25/32* (2013.01); *B64F 1/22* (2013.01); *B64F 1/228* (2013.01); *Y02T 50/826* (2013.01)

(58) Field of Classification Search
CPC .... B64F 1/04; B64F 1/22; B64F 1/228; B64C 25/32
USPC .................................. 505/166, 852, 876, 905
See application file for complete search history.

(56) References Cited

U.S. PATENT DOCUMENTS

| | | | | | |
|---|---|---|---|---|---|
| 3,872,357 | A | * | 3/1975 | Maki ....................... | H02K 41/03 104/282 |
| 4,131,811 | A | * | 12/1978 | Apsit ....................... | B60L 13/10 104/282 |
| 4,276,832 | A | * | 7/1981 | Sika ........................ | B61B 13/08 104/292 |
| 6,170,404 | B1 | * | 1/2001 | Robertson ............... | B61B 13/10 104/155 |
| 6,729,578 | B2 | * | 5/2004 | Wood ....................... | B64F 1/02 104/290 |
| 8,485,468 | B2 | * | 7/2013 | Binnebesel ............. | B64F 1/002 244/110 E |

(Continued)

*Primary Examiner* — Philip J Bonzell
*Assistant Examiner* — Michael B Kreiner
(74) *Attorney, Agent, or Firm* — Greer, Burns & Crain Ltd.

(57) ABSTRACT

A device for moving aircraft along the ground includes at least one runway and at least one aircraft. The aircraft is secured to a tractor element having a magnetic mass formed mainly of type II superconductor material and the runway includes stator coils arranged in the runway with at least one line of coils parallel to an axis of the runway. A command/control system supplies power to the stator coils to generate a magnetic field that levitates the tractor element, magnetized beforehand into a phase II superconducting state, above the runway.

18 Claims, 6 Drawing Sheets

(56) References Cited

U.S. PATENT DOCUMENTS

| 9,302,768 B2* | 4/2016 | Yang | B64C 25/04 |
| 2017/0137149 A1* | 5/2017 | Malicki | B64F 1/002 |

* cited by examiner (a)          (b)

DEVICE FOR MOVING AIRCRAFT ALONG THE GROUND

RELATED APPLICATIONS

This application is a § 371 application from PCT/EP2014/062072 filed Jun. 11, 2014, which claims priority from French Patent Application No. 13 55597 filed Jun. 14, 2013, each of which is herein incorporated by reference in its entirety.

FIELD OF THE INVENTION

The present invention belongs to the field of aircraft propulsion.

More specifically, the invention relates to a device for propelling an airplane as it moves along the ground during the low-speed phases on taxiways, namely the taxiways on which aircraft run as they move around on the ground, or during the high-speed phases during the accelerations/decelerations on a strip during take-off or landing.

BACKGROUND OF THE INVENTION

In the field of aircraft and airplanes in particular, movement on the ground is very generally achieved by running on a landing gear comprising wheels, under the action of the aircraft engines or of a towing vehicle.

A distinction is usually made between the towing performed in order to leave a parking area when the airplane needs to move backward or be moved around without using its engines, running on the taxiways which is performed at low speed but using the propulsive force of the aircraft engines either to move to the start of the takeoff strip before takeoff or to return to a parking area after landing, takeoff which is running at high speed and during which the airplane propelled by its engines accelerates from a zero speed up to the speed at which the wheels leave the ground, and finally landing when the airplane comes back into contact with the ground at a speed compatible with the lift thereof and decelerates along the strip down to a speed that is low enough that it can turn off onto a taxiway.

This wheeled landing gear solution proves penalizing in that the airplane needs to have a heavy and complex landing gear that retracts when the airplane is in cruising flight at a speed higher than a few hundred km/h, and is of use only for a very short period of time during the mission, and in that use is made of the propulsion engines for running along at low speeds for which these engines, for example jet engines, are completely unoptimized. However, in the absence of more satisfactory solutions, almost all present-day airplanes are designed on this principle.

In order to improve performance, the use of ancillary devices has been contemplated.

Thus, it has been envisioned that certain wheels of the landing gear be equipped with motors which, by allowing low-speed running, avoids using the propulsion engines when moving along the taxiways. This solution though has the deficiency of making the landing gear even more complicated and even heavier than a conventional landing gear and has not yet been materially embodied in the operational use of aircraft.

Catapult systems have also been developed to assist airplanes with takeoff. The catapult supplies the airplane with additional energy during acceleration on takeoff by towing the airplane with a suitable force.

Such a system, which is built into the takeoff strip makes it possible to shorten the distance run during takeoff, and this has justified its widespread use on aircraft carriers. However, a catapult is a device that proves restrictive from an operational standpoint and requires a great deal of power in order to develop the desired amount of energy over a very short space of time. A catapult has only one functional direction, something which does not impede its use on an aircraft carrier which always heads into the wind for aircraft takeoff, but in practice would mean installing a catapult in each direction of the strip in the case of a "fixed" strip. Given the various constraints of such a system, airplanes enjoying takeoff assistance using a catapult are currently limited to a few tens of metric tons at most.

OBJECT AND SUMMARY OF THE INVENTION

The present invention relates to a device for the running-around and/or the take-off/landing of aircraft on an airport platform that makes it possible to circumvent the constraints of the present-day systems.

In the case of the invention, use is made of the magnetic properties of type II superconductors in order to produce the traction forces needed for moving the aircraft around on the ground and for guiding them along axes of movement and, in certain embodiments, levitating the airplane above the strip as it moves around on the ground during the phases of running along the taxiways, during takeoffs and during landings.

For that, a device comprises at least one strip, for example a takeoff or landing strip, a taxiway or a parking area, and at least one aircraft, for example an airplane, a helicopter or a drone, able to move around on the strip.

The aircraft is secured to a tractor element which comprises a magnetic mass formed mainly of a type II superconductor which has the particular feature of maintaining a magnetic memory of the magnetic environment in which it is immersed when its temperature is lowered below its superconducting critical temperature under magnetic field conditions that place the material in a phase 2 state.

The strip comprises stator coils built into the strip, arranged in at least one line of coils which is parallel to an axis of the strip.

The device comprises a command/control system which powers the stator coils in such a way as to create a magnetic field that causes the at least one tractor element, previously magnetized into a phase 2 superconducting state, to levitate above the strip.

This then yields a device which allows aircraft to be moved around on the ground without there being any need to operate the aircraft engines, the consequence of this being to reduce pollution and noise in the strip region and reduce the fuel consumption of the aircraft.

The stator coil command/control system comprises at least one mode of powering the stator coils to create a variable magnetic field so as to produce a force causing the tractor element to move along the line of coils so that the aircraft is itself subjected to the controlled force applied to the tractor element to which it is secured.

The tractor element comprises a system for keeping the magnetic mass at a temperature comprised between a temperature lower than a type II superconductor phase 2 critical transition temperature Tc2 and higher than a type II superconductor phase 1 critical transition temperature Tc1. It is thus possible to maintain the magnetic state of the superconductor indefinitely without supplying energy other than the energy needed to maintain its temperature.

In order to initialize the tractor element, the latter comprises at least one initiation coil designed to produce an initial magnetizing field in the magnetic mass. In this arrangement it is possible to initialize the magnetic state of the magnetic mass without the need to resort to external means for creating the magnetization field, thereby making the tractor element and the airplane to which it is secured self-contained.

In one embodiment, the type II superconductor of the tractor element is a YBaCuO alloy containing yttrium, barium, copper and oxygen.

This then yields a mass of which the electrical and magnetic properties when the material is in phase 2 are obtained for relatively high cryogenic temperatures corresponding to the temperature of liquid nitrogen. Liquid nitrogen can easily be stored for relatively long periods consistent with the length of an aircraft mission, or may even be produced locally by a cryogenerator associated with the tractor element.

In one embodiment, the tractor element is secured to the aircraft for towing said aircraft running on wheels of a landing gear of the aircraft. In this embodiment, the tractor element is limited to functions of moving the airplane translationally over the ground and this embodiment can easily be adapted to existing airplanes.

In another embodiment, at least one landing gear of the aircraft, advantageously several landing gears, comprises at least one tractor element fixed to said at least one landing gear in order to levitate the aircraft and tow the aircraft. In this embodiment, the tractor element allows the landing gears no longer to have wheels, or at least to have fewer of them, and the airplane as it moves over the ground no longer has the contact with the strip that causes friction or the constraints associated with rolling and with braking.

In one embodiment which is particularly suitable when airplanes comprise tractor elements arranged on the airplane which are spatially separated in a lateral direction, the strip comprises a plurality of lines of coils which are substantially parallel to the axis of the strip.

In one embodiment, the device comprises a plurality of strips each one comprising at least one line of coils which is substantially parallel to an axis of each of said strips so that the lines of coils forms a continuous network of an airport platform. It is thus possible to move an aircraft around using the stator coils in all the areas in which an aircraft would circulate on the ground.

In one embodiment, the device comprises at least one tractor element magnetization shop, which is connected to the line of coils of the strip by a line of coils.

The invention also relates to a m for moving an aircraft, secured to a tractor element, comprising a magnetic mass formed mainly with a type II superconductor, along a strip, comprising stator coils built into said strip, said coils being arranged in at least one line of coils which is parallel to an axis of said one strip, comprising:

a preliminary step of magnetizing the magnetic mass by applying an initial magnetic field to said magnetic mass when said magnetic mass is at a temperature higher than a critical temperature Tc, then by lowering the temperature of said magnetic mass to a temperature below the critical temperature Tc while maintaining the initial magnetic field, then by canceling the initial magnetic field while keeping the temperature of the magnetic mass below the critical temperature Tc;

a step of creating a magnetic field using the stator coils in order to induce in the tractor element a force that levitates the traction element;

a step of modifying the magnetic field created by the stator coils in order to induce in the tractor element a traction force in a substantially horizontal plane and which force is directed along the at least one line of coils.

The method is particularly well suited to implementation of the device of the invention.

In one implementation of the method, the magnetic field created by the stator coils in order to induce a traction force is modified by a stator coil power command/control system on the basis of commands transmitted to said command/control system, said commands containing an aircraft speed or acceleration instruction.

In one implementation of the method, aircraft propulsion engines are used to produce thrust on said aircraft as it moves around.

The traction forces supplied by the tractor element are then supplied in addition to and/or as a partial replacement for the thrust of the propulsion engines, something that proves particularly beneficial at takeoff.

Depending on the need, the traction force induced in the tractor element and directed along the at least one line of coils can be directed either toward the front of the aircraft or toward the rear of the aircraft. It is thus possible not only to move the aircraft around forward or backward but also to apply braking in order to slow the aircraft as it moves around or to immobilize the aircraft at a given location when the aircraft is subjected to other forces such as the wind or the thrust of the engines in the case of a fixed point with the propulsion engines running.

The invention also relates to a tractor element comprising a magnetic mass formed mainly with a type II superconductor, comprising means for keeping the magnetic mass at a cryogenic temperature below an electrically superconducting critical temperature Tc and comprising at least one hook for securing said tractor element to an aircraft.

The temperature maintaining means comprise, for example, an insulated chamber of a cryostat determining a volume containing a liquid at a temperature below the critical temperature Tc and which allows the desired temperature to be maintained without the addition of energy for a length of time determined only by the thermal losses and the quantity of liquid contained in the chamber and in any liquid filling system there might be.

The type II superconductor is a YBaCuO alloy containing yttrium, barium, copper and oxygen, which is superconducting in phase 2 at the temperature of liquid nitrogen.

In one embodiment, the tractor element comprises at least one initiation coil designed to produce an initial magnetization field in the magnetic mass.

The invention also relates to an airplane comprising at least one tractor element of the invention fixed to the airplane so that the tractor element is near the ground when the airplane is on the ground, and which allows the airplane to enjoy the benefits of the device of the invention.

BRIEF DESCRIPTION OF THE DRAWINGS

A nonlimiting embodiment of the invention is described with reference to the figures which depict.

In the various figures depicting the various embodiments of the invention, elements that are equivalent bear the same reference.

For illustrative purposes, the various elements in one and the same drawing or in the various drawings are not necessarily drawn to the same scale.

DETAILED DESCRIPTION OF THE EMBODIMENTS

Figure 1:
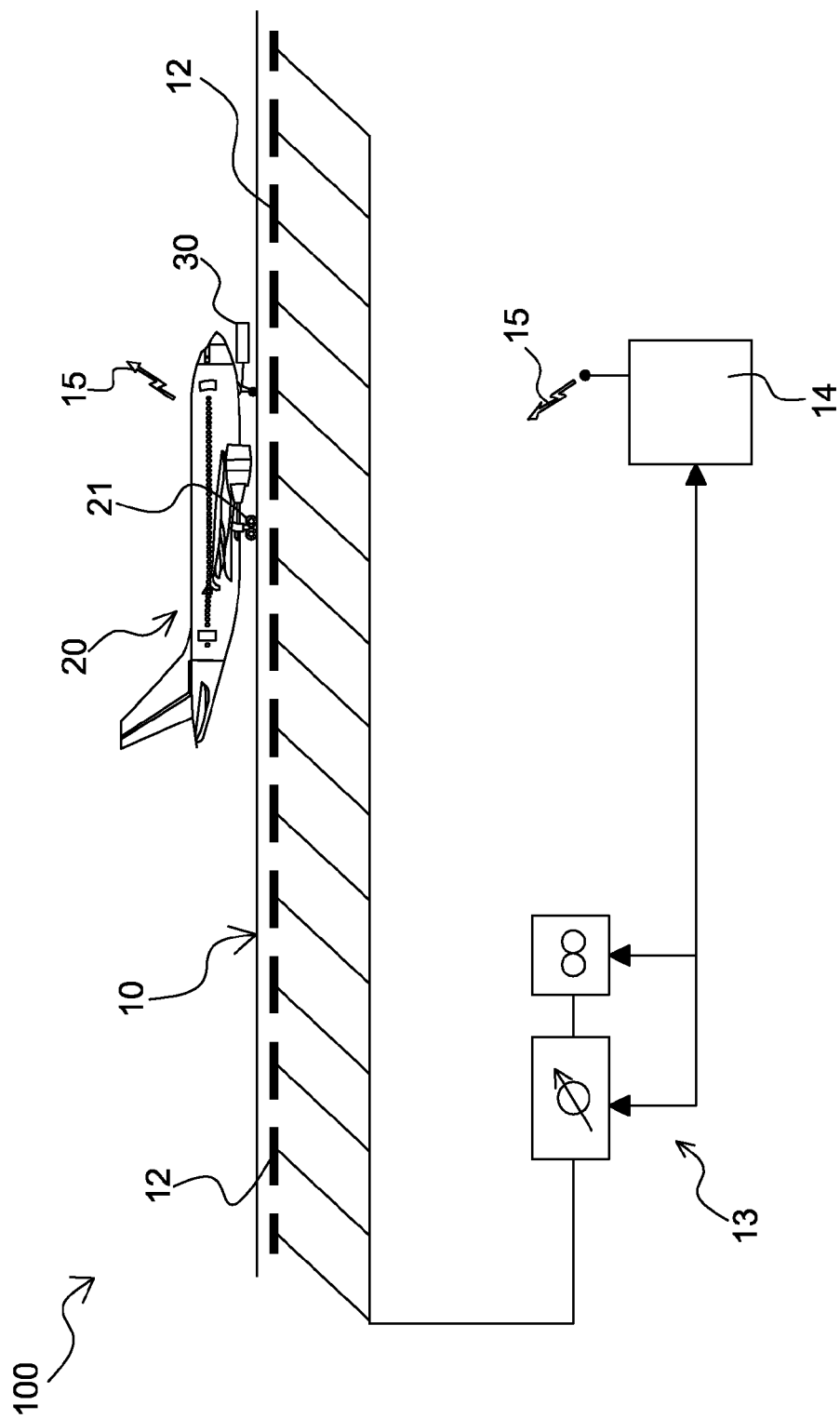
FIG. 1: a general overview of the device and of the main subassemblies thereof.

FIG. 1 is a partial schematic view of one example according to the invention of an overall device for assisting with running and/or with takeoff and/or with landing which comprises a takeoff/landing strip 10 and an airplane 20, for example an airplane in the process of taking off from said strip.

The takeoff phase of an airplane is the phase during which the airplane accelerates from a speed that is zero, or low (a few m/s) in comparison with a takeoff speed, up to a speed Vlo that allows it to leave the ground.

Figure 2A:
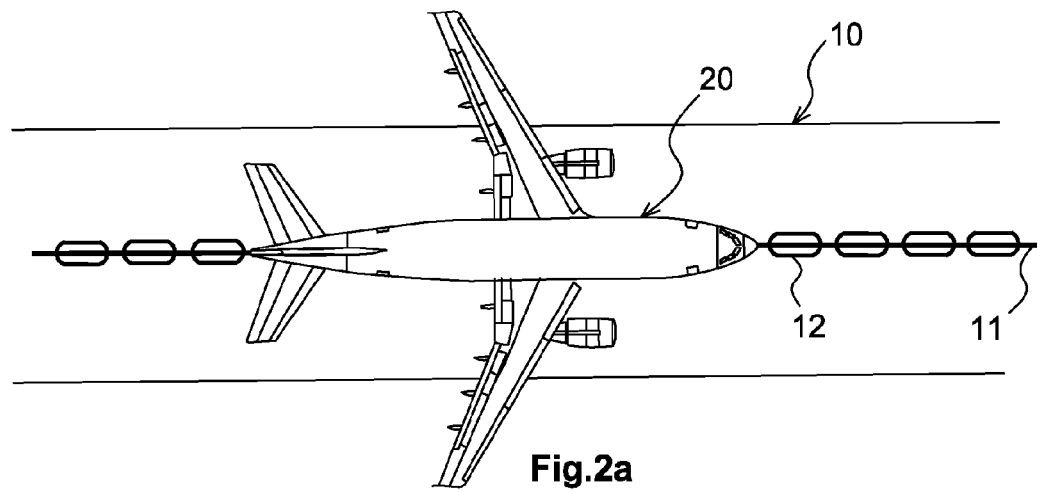
FIGS. 2a, 2b and 2c: a plan, side and front view respectively of an airplane with a wheeled landing gear and secured to a tractor element, on a takeoff/landing strip incorporating stator coils which are visible because the strip has been depicted as if it were transparent.
Figure 2B:
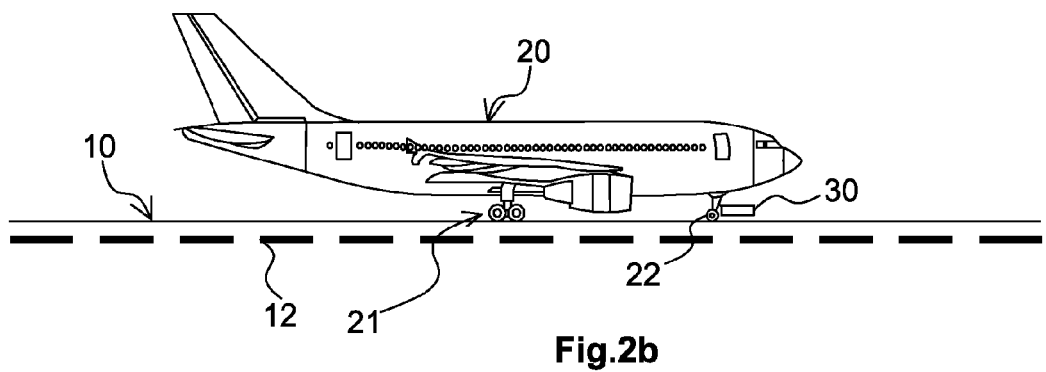
Figure 2C:
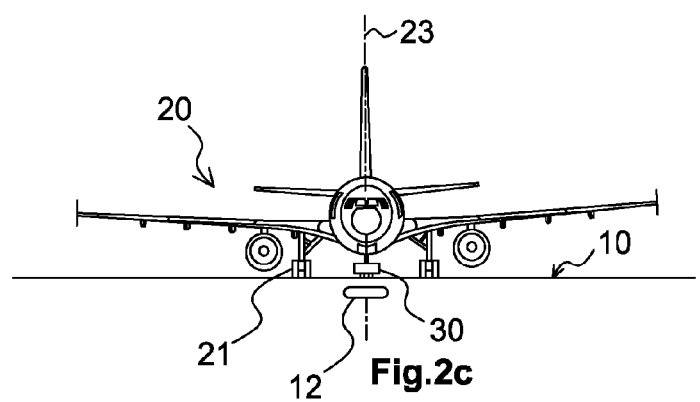

In the embodiment of the example of the device illustrated in FIGS. 2a, 2b and 2c, the airplane 20 comprises a landing gear 21 equipped with wheels, the dimensions and strength of which allow them to support the weight of the airplane on the ground and to allow it to move around by running on said wheels.

In the known way, the strip 10 is defined mainly by its length and width dimensions, assumed to be suited to the needs of the airplane, and the various characteristics of the resistance of its pavement surface, and also by an axis 11 which determines the orientation of the strip and which corresponds to the path followed along the ground by an airplane during the phases of taking off from and landing on said strip.

Furthermore, in the invention, the airplane 10 is secured to a tractor element 30 comprising a magnetic mass, in this instance secured to the landing gear 21 at a front landing gear 22, situated in a vertical axial plane 23 of the airplane. The tractor element 30 is also above the ground and close to the ground, being distant by a few centimeters or tens of centimeters when the airplane is on the ground.

As will be detailed later, the magnetic mass is formed mainly of a type II superconductor, for example a YBaCuO alloy which becomes superconducting at temperatures below 70K, which means to say that this material, which belongs to the high temperature superconductor family, is superconducting at the temperature of liquid nitrogen at standard atmospheric pressure at sea level.

Furthermore, in the invention, the strip 10 comprises along its axis 11 a succession of stator coils 12 each one able to form a magnetic field when powered with an electric current, and designed to produce a magnetic field, the field lines of which are oriented substantially vertically in a local terrestrial frame of reference at each stator coil, for example the lines of the field produced by a flat coil, the plane of which is substantially parallel to the surface of the ground.

The stator coils 12 are arranged along the axis 11 of the strip such that a magnetic field can be created at any point along the entire length of the strip at which the airplane, more particularly at which the tractor element 30, is likely to find itself on the ground during a takeoff or a landing.

The stator coils 12 are, for example, superconducting coils, although they do not necessarily have to be so.

In one embodiment, the stator coils 12 are built into a thickness of the strip 10, the material of the pavement surface of the strip being chosen so that it does not significantly disturb the magnetic field lines, a concrete or a conventional coating known for the pavement surface of strips meeting this requirement.

In all the possible ways of installing the stator coils 12, each of said stator coils is fixed firmly to the ground so that, on the one hand, said coil is immobilized when subjected to the forces generated by the operation of the device and, on the other hand, to ensure the integrity of the coil windings also.

The stator coils 12 are also electrically connected to a coil powering system 13 which conveys electrical energy to said coils and performs the switching necessary for each coil to be powered with the desired polarity when a coil is to be active and to cut off its supply of power when a coil is to be passive.

Figure 3:
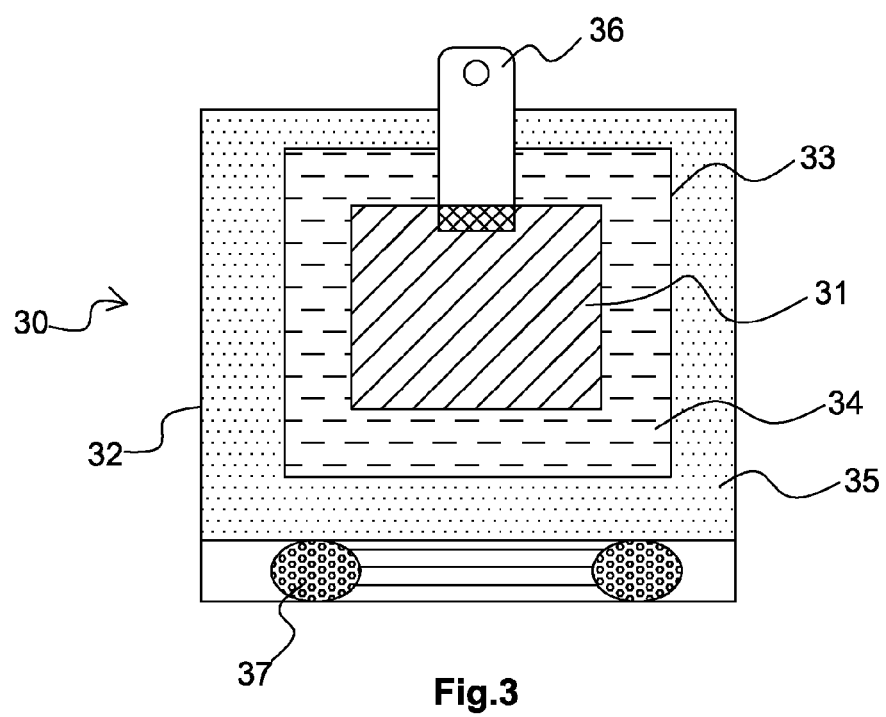
FIG. 3: a highly schematic cross section of a tractor element.

With reference to FIG. 3, the magnetic mass 31 is, as already pointed out, made mainly from a type II superconductor.

Figure 4:
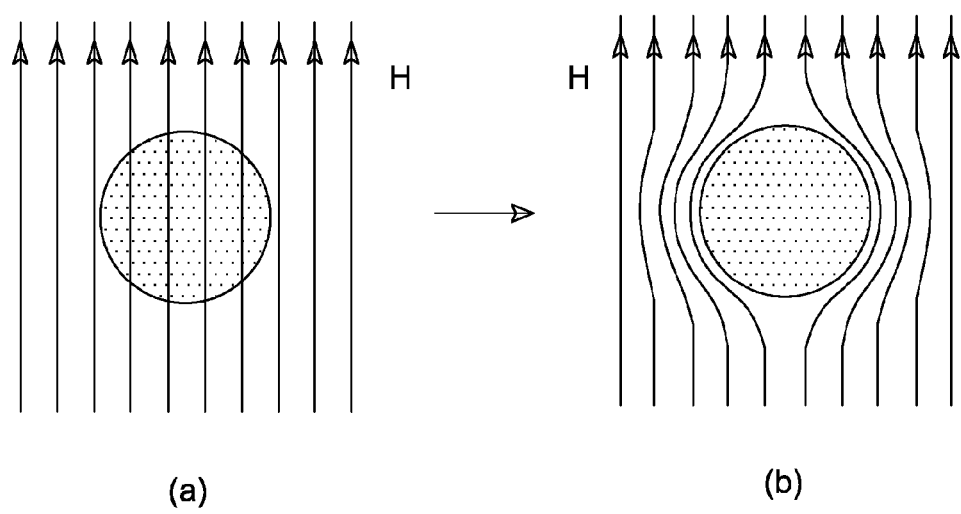
FIG. 4: a diagram presenting a type I superconductor element in a magnetic field, at a temperature above the superconducting critical temperature, detail (a), and at the temperature below the superconducting critical temperature, detail (b)

The magnetic properties of superconductors are known insofar that, in the superconducting state in which the electrical resistance is zero, a body made from one of these materials and in the superconducting state when immersed in a magnetic field is bypassed by the field lines whereas these same field lines pass through it when it is not in the superconducting state, as illustrated symbolically by FIG. 4.

Figure 5:
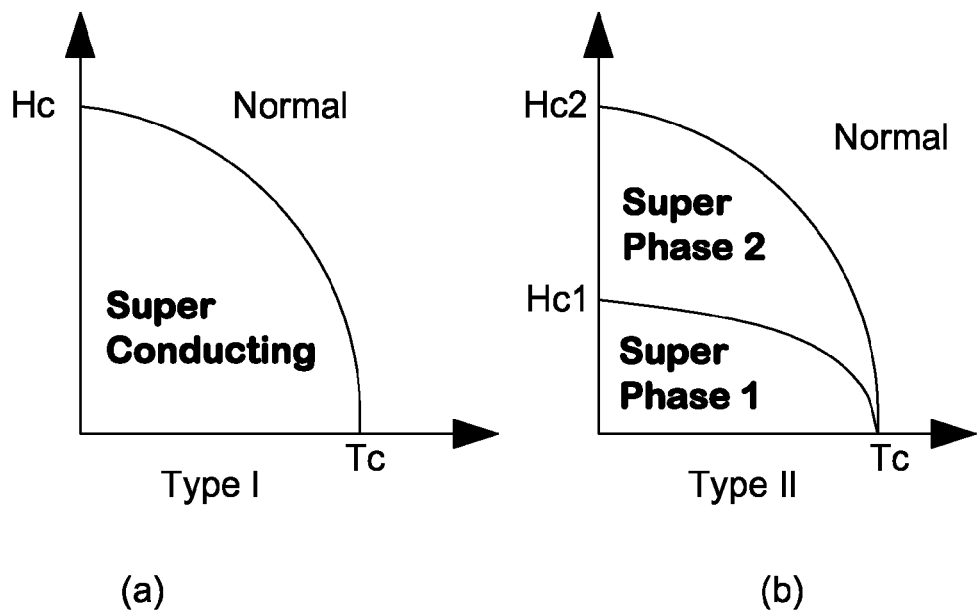
FIG. 5: a comparison between the phase diagrams of a type I superconductor, detail (a), and of a type II superconductor, detail (b)

This property, which is known by the name of the Meissner effect, is observed in the case of type I superconductors as long as the superconductor is placed at a temperature below the critical temperature Tc of the material and as long as the strength of the external magnetic field is below a critical strength above which the material loses its superconducting properties, see FIG. 5(a).

In the case of type II superconductors there is known a state of the material in which the lines of the magnetic field to which the body made of superconductor is subjected pass through this superconductor without it losing its superconducting properties.

Figure 6:
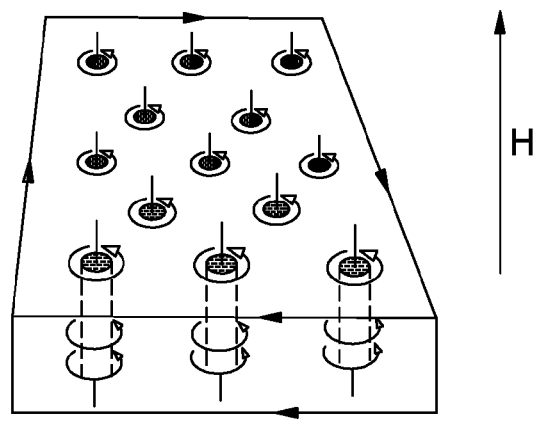
FIG. 6: an illustration of the flux vortex and flux pinning phenomenon in a type II superconductor in the type II superconducting state.

With this type of material, when a body from which it is made is placed in an initial magnetic field of a strength higher than a phase 1 critical field Hc1 and lower than a phase II critical field Hc2, according to the phase diagram illustrated in FIG. 5(b), and is then cooled below a superconducting critical temperature Tc, stable structures generally referred to as vortices are created in the material, as indicated schematically in FIG. 6, these forming a memory of the magnetic field lines and persisting when the external magnetic field is removed, for as long as the temperature of the material is kept below the superconducting critical temperature Tc.

When the material is in this state, the body subjected to a magnetic field holds itself in space in such a way that the magnetic field lines coincide with those that exist during the cooling thereof below the critical temperature Tc.

This holding in space relates not only to the directions orthogonal to the magnetic field lines but also the direction along the direction of the magnetic field. The body is therefore in levitation with no direct contact with a support, or suspended according to the initial conditions. In the invention, the magnetic mass 31 of the tractor element 30, magnetized beforehand, which means to say brought below its critical temperature Tc in the presence of an initial magnetic field, the field lines of which are oriented vertically and the strength of which is below the critical field Hc2 and above the critical field Hc1, is placed in the magnetic field created by the stator coils 12 of the strip 10.

The coils are switched in such a way as to move the resultant magnetic field along a path corresponding to the alignment of the coils, in a way similar to the operation of a conventional linear electric motor, the coils of which constitute a stator giving rise to controlled movement of the magnetic mass 31 of the tractor element, and therefore of the tractor element 30 equivalent to a rotor of the linear motor, and therefore of the airplane 20 to which the tractor element is secured.

Because of the properties of the type II superconductors of the magnetic mass 31 of the tractor element, said tractor element finds itself levitating above the strip 10, creating no mechanical friction with the strip. It is also moved along by the magnetic field of the stator coils in the direction of travel imposed by the movement of the magnetic field created and is held laterally on account of the fact that the magnetic mass 31 is positioned so that the magnetic field lines pass through it and because of the absence of a magnetic field away from the axis defined by the stator coils 12.

The tractor element 30 also comprises means for cooling the magnetic mass and for keeping it at the desired cryogenic temperature.

Advantageously, the magnetic mass 30 is placed in a chamber 32 that limits exchanges of heat with the outside.

In the known way, such a chamber is formed for example by an interior chamber of a cryostat 33 determining a volume 34 containing the magnetic mass 31, said chamber being itself positioned in a jacket 35 which is thermally insulating.

The interior chamber 33 is advantageously filled with a cold liquid, for example liquid nitrogen at the desired temperature below Tc, for example via a filling circuit which has not been depicted.

In one exemplary embodiment, the quantity of cold liquid in the cryostat is defined in such a way as to ensure that the magnetic mass 31 is kept at the desired temperature below Tc for a desired period of use before the cryostat is refilled. In this case, the quantity of cold liquid is then determined according to the thermal losses associated with the imperfections in the insulation of the cryostat and the length of time for which the temperature of the magnetic mass is to be kept below the critical temperature Tc.

In another exemplary embodiment which has not been illustrated, the tractor element 30 comprises a reserve of cold liquid connected to the cryostat in such a way as to introduce and/or maintain a desired level of cold liquid into or in the cryostat when the tractor element is in operation.

In another exemplary embodiment which has not been depicted, the cold liquid is produced at the tractor element by a cryogenic cooler (cryocooler), for example a Peltier-effect machine or a machine operating on a Stirling cycle.

In order to transmit the loads generated by the magnetic fields on the tractor element 30 to the airplane 20, mechanical-connection means of suitable strength are arranged between the magnetic mass 31 or one of the chambers containing it, and means of attachment to the airplane.

These mechanical-connection means which need to transmit force as the airplane moves along, and in certain modes of the acceleration thereof up to speeds close to the liftoff speed Vlo, comprise for example one or more hooks 36, illustrated schematically in FIG. 3, which as far as possible are made of materials that are poor conductors of heat so as to limit the thermal losses between the inside of the cryostat and the outside. A material such as an Invar®, an alloy containing a high nickel content, is one possibility for creating the hooks or link rods able to transmit significant force with modest conduction of heat afforded by the characteristics of the material.

In one exemplary embodiment, the tractor element comprises one or more initiation coils 37 designed to create the initial magnetic field, these initiation coils being powered temporarily so as to create the desired initial magnetic field, maintained in a step during which the temperature of the magnetic mass 31 is lowered below the critical temperature Tc.

In another exemplary embodiment, one or more initiation coils are built into the strip so as to create the initial magnetic field. The initiation coil or coils are, for example, dedicated coils sited at chosen locations on the strip or alternatively are stator coils of the strip which are powered in such a way as to create the initial magnetic field. In these cases it is necessary for the tractor element to be located at the site of an initiation coil or of one of the stator coils intended to be powered as an initiation coil.

In the example illustrated in FIGS. 1, 2a, 2b and 2c, just one takeoff/landing strip is depicted, and in this case is depicted with stator coils arranged along an axis of the strip on which the airplane is to be kept during its takeoff or landing path.

However, in the case of the device of the invention, any surface on the ground over which surface it is desirable to move the airplane in one or more desired paths constitutes a strip.

Figure 7:
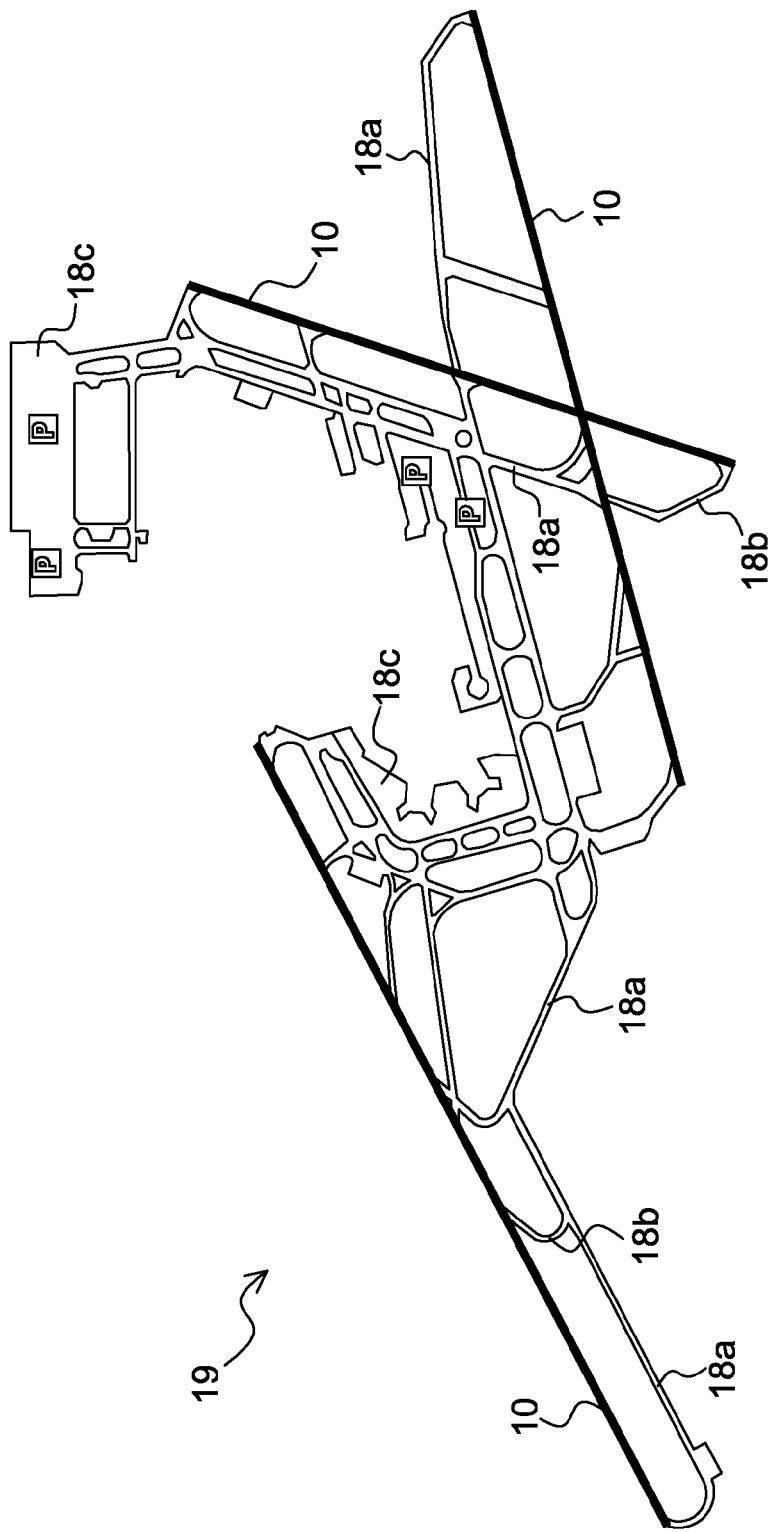
FIG. 7: a plan, by way of example, of the strips of an airport platform comprising a plurality of takeoff/landing strips, taxiways, lead-ons and lead-offs and parking areas.

FIG. 7 depicts, by way of example, a plan of the taxiway areas in which aircraft circulate in the case of a large airport platform 19. Nonlimitingly, a strip may correspond to a takeoff/landing strip 10, to or taxiways 18a and lead-ons and lead-offs 18b used by the airplane to go to the start of a takeoff strip before takeoff or to leave a landing strip after landing as well as the taxiway and parking areas 18c.

All of these surfaces assigned to the movement of the airplane on the ground are referred to here as "strips".

Each strip 10, 18a, 18b, 18c comprises, in the aeronautical domain, an axis 11, generally embodied in a way that is visible to the pilots by a line painted on the pavement surface of such strips and which, in the case of the invention, comprise, at least in the case of part of them, stator coils 12 arranged in an alignment along said axes so as to create a magnetic field along said axes.

The device advantageously comprises a supervisor 14 which communicates with the airplane 20, with the stator coil and initialization coil command/control system, and, in general, with all the systems which contribute to the operation of the device so as to monitor whether each system is in good operation and operating correctly and provide the coordination required for the safety of the airplanes and operators on the strips.

This then yields a device in which equipment built into the infrastructures on the ground and the airplane 20 secured with at least one tractor element 30 collaborate to move the airplane around during all or some of its movements on the ground.

According to one implementation of the device in the embodiments described hereinabove, an airplane 20 is, for example, stationary at a parking point, for example a parking bay or a passenger boarding position, which parking point is situated on a line along which stator coils are arranged.

In a first step, a tractor element 30 is brought up close to the airplane then secured to said airplane for example by a device that fixes it to the forward landing gear 22.

The tractor element 30 may have been magnetized in a dedicated zone, for example a magnetization shop, before being secured to the airplane, or may not have been.

In both instances it may be brought into position by ordinary handling means, for example a suitable transport truck, but if it is already magnetized, it may equally be brought into position from the magnetization zone to the airplane by following a line of stator coils.

Because of the levitation of the tractor element in the latter instance, the tractor element can be moved around with minimum force, for example pulled or pushed by an operator, if all the coils in the path followed have been energized in such a way as to create a magnetic field with substantially constant characteristics along the path of travel. In a magnetic field generated by this mode of energizing the coils, the tractor element 30 is not subjected to any force of propulsion in the direction of the alignment of the stator coils 12 but is held laterally without being able to deviate from the line embodied by said stator coils.

In an alternative form, the stator coils 12, the alignment of which corresponds to the path that the tractor element 30 needs to follow in order to reach the airplane 20, are energized in succession as in the linear motor mode of operation so that the tractor element 30 moves toward the airplane with no direct mechanical intervention. Such a motorized movement may be achieved automatically by a tractor element management and guidance system or may be partially under the control of an operator, for example who has a remote control acting on the stator coil command/control system.

When the tractor element 30 has not been previously magnetized before being secured to the airplane, a magnetization step is carried out. During this magnetization step, the tractor element is placed above ground at a levitation height at which it is to be subsequently moved around. The positioning at the desired height may be achieved by suitable shims which will later be removed or by a temporary lifting system, not depicted, arranged on the ground or on the airplane. Next, the initial magnetic field required for magnetizing the magnetic mass is created either by initiation coils 37 of the tractor element 30 or by initiation coils or stator coils built into the strip, then the temperature of the magnetic mass 31 is lowered below the critical temperature $T_c$, for example by filling the chamber of the cryostat containing the magnetic mass with liquid nitrogen. When the intended temperature for the magnetic mass is reached and has stabilized, the initial magnetic field is canceled.

At this stage, the airplane 20 is ready to be moved around by the tractor element 30, in this example by running on the wheels of the landing gear 21.

In a second step, suitable energizing of the stator coils 12 built into the strip on which the airplane 20 is standing which in the case of those spread out along the desired path along the ground form the stator of the linear motor of which the tractor element is the rotor, is performed by the coil command/control system 13, on the basis of information from the supervisory system 14, so that the airplane is moved around between the various locations on the ground at a desired speed of running for example to another parking point such as a passenger boarding area.

It must be pointed out that multiple paths for reaching two or more strips provided with stator coils are possible, the choice of which stator coils are energized determining the path that is followed. Thus "invisible" routers are formed, these being managed by the coil command/control system.

It should be pointed out that, provided that a device for coupling the tractor element to the airplane is suitable, the airplane can be moved around with equal ease in both directions: toward the front of the airplane or toward the rear of the airplane, the latter scenario being of particular benefit when an airplane is leaving an area in which passengers are boarded using walkways.

In this second step, the airplane 20 is also, if desired, moved from a parking location to a threshold of a takeoff strip 10.

In one embodiment, the supervisory system 14 transmits instructions for the movement of the airplane 20 on the basis of demands transmitted from said airplane and that take potential ground movements of other airplanes into consideration.

In another embodiment, the movement of the airplane 20 towed by the tractor element 30 is commanded continuously by an operator, for example a pilot in the airplane, whose steering commands in terms of direction, when there is a possibility to choose between several strips, and in terms of speed, are transmitted to the coil command/control system 13 in order to move the airplane. In this embodiment, the airplane is moved around under the instructions of the airplane pilot alone or of an operator on the ground, like when the airplane is being moved around using its engine or by a towing vehicle in the procedures implemented at the present time, but with the possibility of the supervisor 14 intervening and modifying the instructions of the operator if need be, for example immobilizing the airplane for safety reasons.

The communications and transmissions of data and commands between the airplane 20 and the supervisor 14 are performed by any data transmission means. For example, the transmission of data is performed by radio links 15 which may be existing links of the data link type. The transmission of data may also be performed by means assigned to the device, for example using the coil power and control network.

In a third step when the airplane 20 has been moved by the tractor element 30 to the threshold of a takeoff strip, the airplane begins a takeoff phase.

In one embodiment, takeoff is achieved in the conventional way using only the propulsion means that the airplane uses in flight.

In this mode, the pilot of the airplane 20 or the supervisory system 14 via the coil command/control system commands the separation of the tractor element 30 and movement thereof to a standby station or to another airplane that is to be towed.

The pilot is then in a position to perform a conventional takeoff after having fired up his engines, something which if appropriate has been performed during the towing step before arriving at the takeoff strip 10.

In another embodiment, with the takeoff strip 10 comprising stator coils 12, said stator coils are powered in such a way that the tractor element 30 accelerates the airplane 20 along the axis of the strip 10, thereby creating a catapult effect.

The action of the tractor element 30 is combined with the action of the airplane propulsion engines to accelerate the airplane 20 up to takeoff speed Vlo, at the moment at which take off the propulsion engines need to supply the airplane with the expected takeoff thrust.

It must be pointed out here that an initial phase of acceleration along the takeoff strip by the tractor element 30 with the engines at idle before demand is placed on the engines, be they jet engines or propeller engines, in order to obtain the takeoff thrust makes it possible to limit the risk of ingestion of foreign objects which could be present on the strip 10, thus making it possible to improve the reliability or durability of the jet engines or of the propellers.

When the takeoff speed is reached and the airplane 20 leaves the ground, in the embodiment described, the tractor element 30 is disconnected from the airplane then the coil command/control system 13 decelerates the tractor element 30 and guides its return for a further use according to instructions received from the supervisory system 14.

Advantageously the pilot or systems of the airplane communicate with the coil command/control system in order to transmit, if need be, an emergency stop command before an aborted takeoff decision speed V1 is reached.

If an emergency stop command is issued, the stator coils are powered in such a way that they no longer exert traction on the tractor element, while at the same time maintaining the lift thereof in order to avoid damage to the tractor element, and if need be, the stator coils 12 of the strip 10 are powered in such a way as to reverse the direction of the force generated on the tractor element 30 and contribute to the emergency braking of the airplane 20.

After a flight of the airplane, and when the latter has touched down and left the landing strip, the supervisory system 14 transfers a tractor element 30 toward the airplane 20 to which it becomes secured so as to tow the airplane to a planned parking area.

It will be noted here that different tractor elements and/or stator coils of a different type can be implemented according to whether the airplane is being moved around at low speed, like in the taxiway areas, or accelerated and moved around at high speed during takeoff in which the forces and energies involved are substantially greater.

In the embodiment described and the implementation thereof, the tractor element 30 belongs to a ground subassembly of the device 100.

In another exemplary embodiment, the tractor element 30 is secured to the airplane 20 of which it forms part without being detachable therefrom for the purposes of operation of the device.

In that example, operation of the device 100 is simplified insofar as the tractor elements 30 are no longer managed by the supervisory system 14, at least when the tractor elements 30 are being moved around without the airplane, and insofar as there is no need to have a means of connection/disconnection between the tractor element and the airplane.

The tractor element 30 is then fixed permanently to the airplane 20, for example on the landing gear 21.

In this embodiment, the device 100 additionally allows the airplane to be braked and guided when it is running along during a landing, provided that the magnetic mass 31 of the tractor element 30 is always in the temperature and magnetism conditions required for it to operate.

Figure 8A:
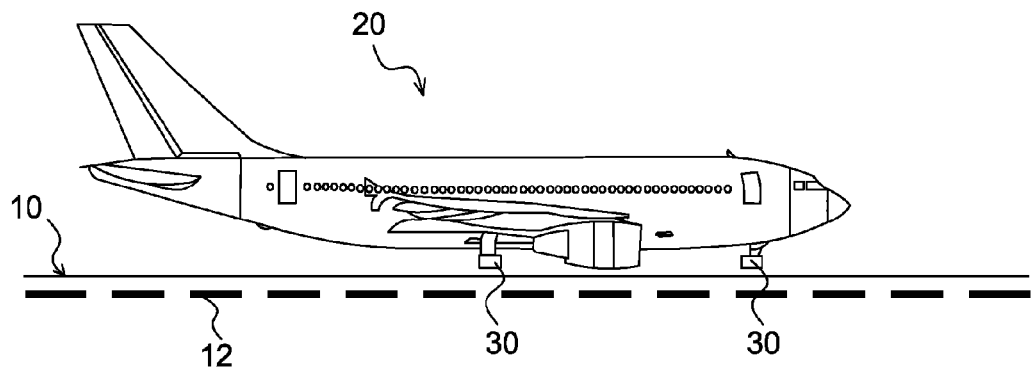
FIG. 8: an outline diagram of an airplane which is levitated above a strip by a plurality of tractor elements, viewed from the side, detail (a), and viewed from the front, detail (b).
Figure 8B:
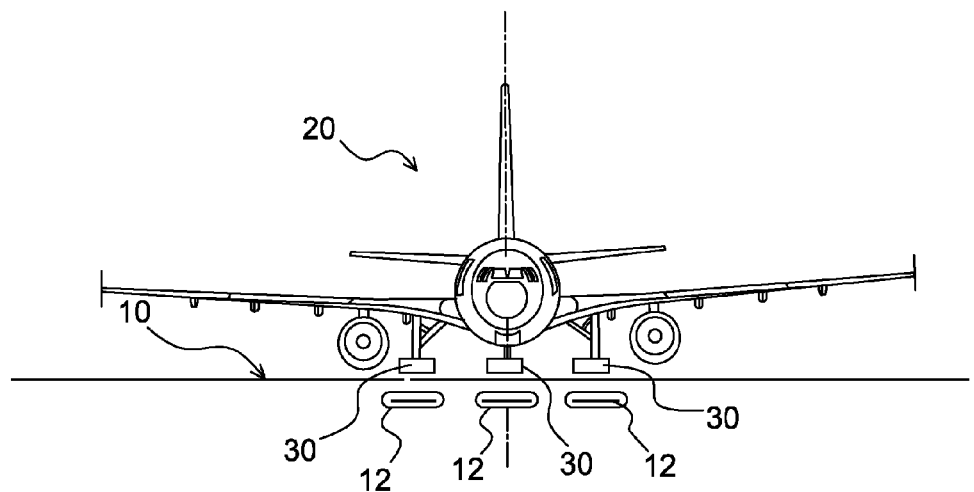

In one embodiment, tractor elements 30 are fixed to the airplane 20 by a wheel-less landing gears system as indicated schematically on the airplane of FIG. 8, the wheels then being replaced in their supporting function by the tractor elements which are able to levitate above the ground incorporating stator coils 12 and in their function of limiting the effort required for movement because of the complete absence of friction of the tractor elements 30 in the levitation state.

The landing gear system advantageously comprises ground support elements on which the weight of the airplane rests when the tractor elements 30 are not in levitation, either because the temperature and magnetism conditions have not been respected in the case of the magnetic masses 31 of the tractor elements or because no power is being applied to the stator coils 12 in the strip 10, 18a, 18b, 18c. These support elements on the one hand each have a large enough surface area to spread the weight of the airplane it supports over the pavement surface of the strip and, on the other hand, can be raised or lowered with respect to the magnetic mass of a tractor element so as to place said magnetic mass in the desired position for magnetization so as to guarantee levitation in operation without friction with the ground.

In this embodiment of the device 100, the strip comprises at least one line of stator coils for each of the tractor elements 30 of the airplane which may not follow the same line, which means to say which are not aligned with a direction in which the airplane moves over the ground. This scenario will generally be encountered if the airplane comprises a tractor element at the site of each of the wing landing gears of a conventional airplane and a tractor element at the site of the forward landing gear, which in this case determines three lines of stator coils for one and the same path followed.

However, specific airplane architectures may be envisioned by combining solutions involving tractor elements and wheels.

For example, a landing gear may be produced with wing-mounted landing gears that have tractor elements and an auxiliary forward landing gear with a wheel so that each path followed uses just two lines of stator coils.

For example, a landing gear may be created that has several tractor elements aligned along a longitudinal axis of the airplane, this being what is referred to as a single-track landing gear which requires just one line of stator coils, the lateral stability of the airplane being provided for example by auxiliary landing gears of the rocker beam type.

It should be noted that this embodiment of the device, particularly when the airplane is completely subjected to levitation as it moves around on the ground, the strips are no longer stressed by the running forces associated with the pressure applied to the ground by the tires of the landing gear.

With the device 100 of the invention there is obtained an assembly comprising at least one strip and at least one aircraft which, for the purposes of moving the aircraft around on the ground at low speed on the circulation strips and at high speed on the takeoff/landing strips uses high-performance and quiet means, thereby avoiding or limiting the use of the engines when the aircraft is moving around on the ground.

The device 100 allows the use of the aircraft propulsion engines in the low-speed running phases to be replaced and provides assistance to the propulsion engines during takeoff, with benefits regarding fuel consumption, and chemical and noise pollution.

The aircraft may be an airplane as in the example illustrated or may be another type of aircraft that has a phase of rolling along on takeoff, at least under certain conditions, such as a helicopter for example.

The invention claimed is:

1. A device comprising:
    at least one strip;
    at least one aircraft configured to move along said at least one strip, said at least one aircraft is secured to at least one tractor element comprising a magnetic mass formed mainly with a type II superconductor;
    stator coils built into said at least one strip, the stator coils are arranged such that at least one line of coils is parallel to an axis of said at least one strip; and
    a command/control system powers the stator coils to generate a magnetic field to cause said at least one tractor element, previously magnetized into a phase II superconducting state, to levitate above said at least one strip.

2. The device as claimed in claim 1, wherein the command/control system comprises at least one mode of powering the stator coils to generate a variable magnetic field so as to produce a force causing said at least one tractor element to move along said at least one line of coils.

3. The device as claimed in claim 1, wherein said at least one tractor element comprises a temperature system to keep the magnetic mass at a temperature lower than a type II superconductor phase II critical transition temperature Tc2 and higher than a type II superconductor phase 1 critical transition temperature Tc1.

4. The device as claimed in claim 1, wherein said at least one tractor element comprises at least one initiation coil configured to produce an initial magnetizing field in the magnetic mass.

5. The device as claimed in claim 1, wherein the type II superconductor is a YBaCuO alloy containing yttrium, barium, copper and oxygen.

6. The device as claimed in claim 1, wherein said at least one tractor element is secured to the aircraft to tow the aircraft running on wheels of a landing gear of the aircraft.

7. The device as claimed in claim 1, wherein at least one landing gear of the aircraft comprises said at least one tractor element fixed to said at least one landing gear to levitate the aircraft and tow the aircraft.

8. The device as claimed in claim 1, wherein said at least one strip comprises a plurality of lines of coils substantially parallel to the axis of said at least one strip.

9. The device as claimed in claim 1, further comprising a plurality of strips, each strip comprising at least one line of coils which is substantially parallel to an axis of said each strip such that the lines of coils form a continuous network of an airport platform.

10. The device as claimed in claim 1, further comprising at least one tractor element magnetization shop connected to said at least one line of coils of said at least one strip by a line of coils.

11. A method for moving an aircraft, secured to a tractor element comprising a magnetic mass formed mainly with a type II superconductor, along a strip comprising stator coils built into the strip, the stator coils are arranged with at least one line of coils parallel to an axis of the strip, comprising the steps of:
    magnetizing the magnetic mass by applying an initial magnetic field to the magnetic mass at a temperature higher than a critical temperature Tc; then lowering the temperature of the magnetic mass to a temperature below the critical temperature Tc while maintaining the initial magnetic field; then canceling the initial magnetic field while keeping the temperature of the magnetic mass below the critical temperature Tc;
    generating a magnetic field using the stator coils to induce in the tractor element a force that levitates the traction element;
    modifying the magnetic field generated by the stator coils to induce in the tractor element a traction force in a substantially horizontal plane, the traction force is directed along said at least one line of coils.

12. The method as claimed in claim 11, further comprising the step of modifying the magnetic field generated by the stator coils to induce the traction force by a power command/control system in accordance with commands transmitted to the command/control system, the commands comprising an aircraft speed or acceleration instruction.

13. The method as claimed in claim 11, further comprising the step producing thrust on the aircraft using aircraft propulsion engines as the aircraft moves.

14. The method as claimed in claim 11, further comprising the step of directing the traction force either towards front of the aircraft or towards rear of the aircraft.

15. An airplane comprising at least one tractor element fixed to the airplane such that said at least one tractor element is near the ground when the airplane is on the ground; and wherein said at least one tractor element comprises a magnetic mass formed mainly with a type II superconductor, a temperature device to keep the magnetic mass at a cryogenic temperature below an electrically superconducting critical temperature Tc, and at least one hook to secure the tractor element to an aircraft.

16. The tractor element as claimed in claim 15, wherein the temperature device comprises an insulated chamber of a cryostat determining a volume containing a liquid at a temperature below the critical temperature Tc.

17. The tractor element as claimed in claim 16, wherein the type II superconductor is a YBaCuO alloy containing yttrium, barium, copper and oxygen.

18. The tractor element as claimed in claim 15, further comprising at least one initiation coil configured to produce an initial magnetization field in the magnetic mass.

* * * * *